(12) United States Patent
Baba

(10) Patent No.: US 11,358,052 B2
(45) Date of Patent: Jun. 14, 2022

(54) METHOD AND SYSTEM BY WHICH COMPUTER ADVANCES GAME ON BASIS OF USER POSITION INFORMATION

(71) Applicant: COLOPL, INC., Tokyo (JP)

(72) Inventor: Naruatsu Baba, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 16/386,218

(22) Filed: Apr. 16, 2019

(65) Prior Publication Data

US 2019/0240566 A1 Aug. 8, 2019

Related U.S. Application Data

(63) Continuation of application No. PCT/JP2017/037508, filed on Oct. 17, 2017.

(30) Foreign Application Priority Data

Oct. 17, 2016 (JP) .............................. JP2016-203974
Oct. 18, 2016 (JP) .............................. JP2016-204426
Oct. 18, 2016 (JP) .............................. JP2016-204427
Oct. 18, 2016 (JP) .............................. JP2016-204428
Oct. 18, 2016 (JP) .............................. JP2016-204429

(Continued)

(51) Int. Cl.
*A63F 13/00* (2014.01)
*A63F 13/216* (2014.01)
(Continued)

(52) U.S. Cl.
CPC ............. *A63F 13/216* (2014.09); *A63F 13/63* (2014.09); *A63F 13/65* (2014.09); *A63F 13/822* (2014.09);
(Continued)

(58) Field of Classification Search
CPC .................................................... G06T 19/006
See application file for complete search history.

(56) References Cited

U.S. PATENT DOCUMENTS 8,694,553 B2 * 4/2014 Shuster ................. G06T 19/003
707/802
8,968,099 B1 * 3/2015 Hanke ................... A63F 13/216
463/42

(Continued)

FOREIGN PATENT DOCUMENTS

JP H9-114370 A 5/1997
JP 2002-49681 A 2/2002
(Continued)

OTHER PUBLICATIONS

Written Opinion in PCT/JP2017/037508, dated Jan. 16, 2018. 14pp.
(Continued)

*Primary Examiner* — Omkar A Deodhar
*Assistant Examiner* — Eric M Thomas
(74) *Attorney, Agent, or Firm* — Hauptman Ham, LLP

(57) ABSTRACT

A method includes acquiring position information of a user. The method further includes receiving an input operation designating a position range that enables configuring a game parameter in map data usable in a game. The method further includes advancing a game such that, when the acquired position information is in the position range based on the game parameter.

20 Claims, 7 Drawing Sheets

(30) Foreign Application Priority Data

Oct. 18, 2016 (JP) .............................. JP2016-204430
Oct. 18, 2016 (JP) .............................. JP2016-204431

(51) Int. Cl.
- A63F 13/63 (2014.01)
- A63F 13/65 (2014.01)
- A63F 13/822 (2014.01)

(52) U.S. Cl.
CPC . *A63F 2300/205* (2013.01); *A63F 2300/5573* (2013.01); *A63F 2300/6018* (2013.01); *A63F 2300/69* (2013.01)

(56) References Cited

U.S. PATENT DOCUMENTS

| | | | |
|---|---|---|---|
| 2011/0319148 A1* | 12/2011 | Kinnebrew | A63F 13/65 463/1 |
| 2012/0040692 A1 | 2/2012 | Baba | |
| 2013/0310079 A1 | 11/2013 | Kuwahara | |
| 2015/0246287 A1 | 9/2015 | Etter et al. | |
| 2018/0214770 A1 | 8/2018 | Inomata | |
| 2018/0361248 A1* | 12/2018 | Nomura | A63F 13/65 |

FOREIGN PATENT DOCUMENTS

| | | |
|---|---|---|
| JP | 2002-273054 A | 9/2002 |
| JP | 4789222 B2 | 10/2011 |
| JP | 201359573 A | 4/2013 |
| JP | 2013-236841 A | 11/2013 |
| JP | 201454370 A | 3/2014 |
| JP | 5909301 B1 | 4/2016 |

OTHER PUBLICATIONS

International Search Report in PCT/JP2017/037508, dated Jan. 16, 2018. 5pp.

"Basic knowledge of 'Pokemon GO'", "Poket-Monster Sun Poket-monster Moon, information front line-frontline-/Pokemon GO', Trainers Book, Electric shock, Nintendo, October issue, appendix", Aug. 20, 2016, p. 6-p. 9, Kadokawa Corporation. 6pp.

"Dragon Quest IX Star's Gardian", Dengeki DS & Will vol. 7 Dengeki Nintendo DS additional edition March, ASCII Media works, Mar. 1, 2009, vol. 9, No. 5, pp. 16-27. 15pp.

Office Action in JP Application No. 2016-203974, dated Sep. 3, 2020. 8pp.

Office Action in JP Application No. 2016-203974, dated Feb. 26, 2021. 8pp.

Office Action in JP Application No. 2016-203974, dated Sep. 3, 2021. 8pp.

* cited by examiner

FIG. 5

250 STORAGE UNIT

253 USER INFORMATION

GAME PROGRESS STATUS MANAGEMENT TABLE

| USER ID | EXPERIENCE POINT | STORY LEVEL | ASSIGNED EVENT (UPPER LIMIT SET) | AMOUNT OF GAME CURRENCY POSSESSED | ITEMS POSSESSED | CANDIDATE CHARACTERS FOR ORGANIZING PARTY INCLUDING ENEMY CHARACTERS ACQUIRED |
|---|---|---|---|---|---|---|
| 00000001 | ... | ... | EVENT ID: 11111111 | ... | ... | ... |
| | | | EVENT ID: 22222222 | ... | ... | ... |
| | | | EVENT ID: 33333333 | | | |
| ... | ... | ... | | ... | ... | ... |

FIG. 6

STORAGE UNIT (250)

GAME INFORMATION (252)

EVENT MANAGEMENT TABLE

| EVENT (QUEST) ID | DESTINATION | EVENT CONTENT | TERM OF VALIDITY OF EVENT | EVENT ACQUISITION DATE, TIME, AND LOCATION | EVENT CLEARED DATE AND TIME | PLAYERS PARTICIPATING IN EVENT |
|---|---|---|---|---|---|---|
| 00000001 | ××× | ××× | ××× | ××× | ××× | PLAYER ID: 22222222<br>PLAYER ID: 33333333 |
| ××× | ××× | ××× | ××× | ××× | ××× | ××× |

METHOD AND SYSTEM BY WHICH COMPUTER ADVANCES GAME ON BASIS OF USER POSITION INFORMATION

RELATED APPLICATIONS

The present application is a continuation of International Application No. PCT/JP2017/037508, filed Oct. 17, 2017, which claims priority from Japanese Application Nos. 2016-203974, filed Oct. 17, 2016, and 2016-204426, 2016-204427, 2016-204428, 2016-204429, 2016-204430 and 2016-204431, all filed Oct. 18, 2016, the disclosures of which applications are hereby incorporated by reference herein in their entirety.

TECHNICAL FIELD

The present disclosure relates to a technique for advancing a game based on position information of a user.

BACKGROUND

In recent years, game programs using user position information have been provided to users, and these game programs have attracted attention as they not only provide a game play that users can enjoy but also encourage the users to move through the game play.

Patent Document 1 below describes a technique, for use in a game using a cellular phone terminal equipped with a global positioning system (GPS), for preventing a user holding the cellular phone terminal from improperly acquiring a movement distance of the user when, for example, points are added in accordance with the movement distance of the user. Patent Document 2 below describes a game system configured to set a game parameter using information acquired from map data corresponding to a position of a player terminal, to thereby progress a game. Specifically, the technique described in Patent Document 2 includes acquiring a map of a certain region having, as a center thereof, the position of a player terminal and setting a game parameter corresponding to the player based on facility information included in the acquired map.

CITATION LIST

Patent Documents

[Patent Document 1] Japanese Patent No. 4789222
[Patent Document 2] Japanese Patent No. 5909301

SUMMARY

In this manner, game programs using user position information have attracted increasing attention. An object of at least one embodiment of the present disclosure is to provide a game program with further enhanced attractiveness.

According to at least one embodiment, a method by which a computer advances a game based on user position information is provided. This method includes performing, by a processor, a step of receiving an input operation with which the user designates a specific position range that enables the user existing therein to have a game parameter configured, in map data used in the game. The method further includes a step of acquiring the position information of the user. The method further includes a step of advancing a game such that, when the acquired position of the user is included in the specific position range designated by the user, the game parameter of the user is configurable.

In at least one aspect, a game may be advanced such that game parameters for a user are configurable by the user being in a specific position range designated by the user, which further enhances attractiveness of the game. In at least one aspect, the user specifies by him/herself a specific position range, for example, in his or her daily travel distance including his/her house, office, or school, which enables the user to experience the game through movement in a daily life.

The above-mentioned and other objects, features, aspects, and advantages of the disclosure may be made clear from the following detailed description of this disclosure, which is to be understood in association with the attached drawings.

BRIEF DESCRIPTION OF DRAWINGS

FIG. 5 A diagram of a data structure of a table for the server to manage a progress status in which users have advanced a game, as user information, according to at least one embodiment.

FIG. 6 A table for the server to manage an event to be given to a user, as game information, according to at least one embodiment.

DETAILED DESCRIPTION

Embodiments of the present disclosure will be described below with reference to the accompanying drawings. In the following description, like components are denoted by like reference symbols. The same applies to the names and functions of those components. Therefore, detailed description of those components is not repeated.

In at least one embodiment, a user operates an information processing apparatus equipped with a touch screen, such as a smartphone, for example, to advance a game while exchanging data on the game between a game server and the smartphone. The game corresponds to both single play in which the user plays the game alone and multi play in which the user plays the game with another user.

Figure 1:
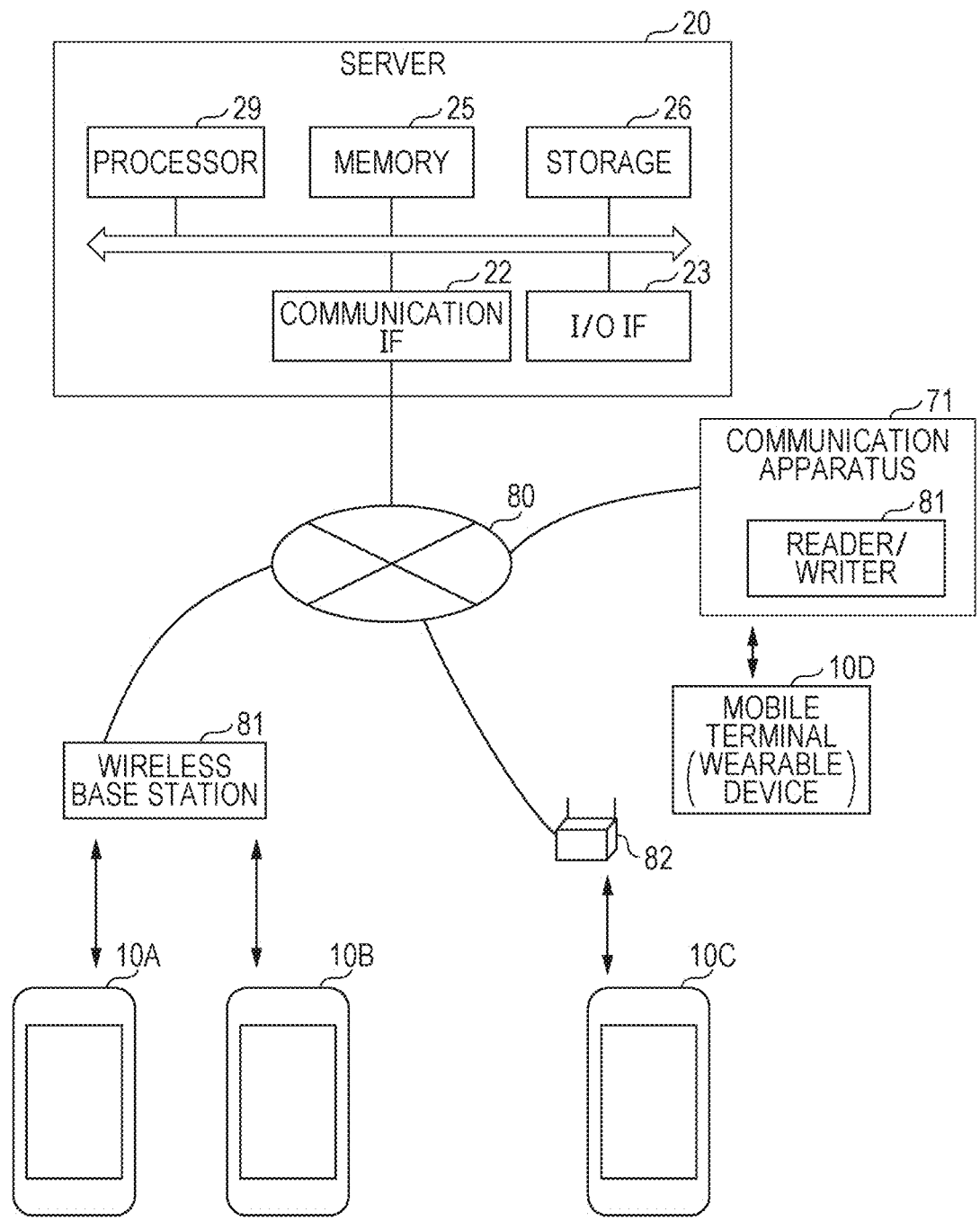
FIG. 1 A diagram of a hardware configuration of a game distribution system according to at least one embodiment.

FIG. 1 is a diagram of a hardware configuration of a game distribution system 1 according to at least one embodiment. In FIG. 1, the game distribution system 1 includes information processing apparatuses used by users and a server 20, and these apparatuses are communicatively connected to each other through a network 80.

In FIG. 1 a plurality of mobile terminals, as information processing apparatuses used by users, such as a mobile terminal 10A, a mobile terminal 10B, a mobile terminal 10C, and a mobile terminal 10D (hereinafter, mobile terminals such as the mobile terminals 10A, 10B, 10C, 10D are collectively referred to as a "mobile terminal 10"). The mobile terminal 10A and the mobile terminal 10B are connected to the network 80 through communications with a wireless base station 81. The mobile terminal 10C is connected to the network 80 through communications with a wireless router 82 installed in a house or other facilities. In at least one aspect, the mobile terminal 10 is a terminal equipped with a touch screen, examples of which include smartphones, fablets, and tablets. In at least one aspect, the mobile terminal 10 is a wearable device. When the mobile terminal 10 is a wearable device, for example, the wearable device communicates with another information processing apparatus carried by a user.

In at least one aspect, the mobile terminal 10D communicates with a communication apparatus 71 through near field wireless communications. The communication apparatus 71 is equipped with a reader/writer 81 that supports near field wireless communication standards, such as near field radio communication (NFC), for example. The mobile terminal 10D is equipped with an NFC chip that supports NFC or the like. Bringing the mobile terminal 10D in close contact with the reader/writer 81 within a certain distance enables input and output of information between the terminal and the reader/writer. The NFC chip may store various kinds of information, and may be used for various kinds of processing including recording of electronic money and recording of boarding and alighting public transportation services (trains, buses, etc.), for example. For example, bringing the mobile terminal 10D equipped with an NFC chip in close contact with the reader/writer apparatus 81 within a certain distance enables settlement processing, recording of public-transportation-service boarding places and alighting places, and the like. Through this operation, the mobile terminal 10D may register places of the user in the server 20 or the like. For example, when the mobile terminal 10D communicates with the reader/writer apparatus 81 through near field wireless communications, the reader/writer apparatus 81 communicates with the server 20, whereby the server 20 retains a history of communication content exchanged between the mobile terminal 10D and the reader/writer apparatus 81. In this case, the communication apparatus 71 transmits the communication history between the reader/writer apparatus 81 and the mobile terminal 10D to the server 20 or the like, whereby the server 20 may learn when and where (the place in which the reader/writer 81 is installed) the mobile terminal 10D is. Through this operation, the position of the user may be registered in the server 20.

The mobile terminal 10 provides the user, through the operation of a game program, with an environment in which the user plays the game in accordance with the game program. The mobile terminal 10 has a game program installed via a platform distributing applications and the like, for example. The mobile terminal 10 executes a game program installed in the mobile terminal 10 or a preinstalled game program, thereby enabling the user to play a game. The mobile terminal 10 loads and executes the game program, thereby enabling communication connection between the mobile terminal 10 and the server 20 and exchanging data on the game between the mobile terminal 10 and the server 20 in accordance with the game progress.

The server 20 transmits data required for playing the game as necessary to the mobile terminal 10, thereby advancing the game play on the mobile terminal 10. The server 20 manages various types of data related to the game on users playing the game. The server 20 communicates with the mobile terminal 10, thereby transmitting images, audio, text data, and other types of data in accordance with the game progress of the corresponding user to the mobile terminal 10.

For example, the server 20 manages progress status showing how users have advanced stories in the game, information on game characters available to the users among the game characters appearing in the game, parameters showing the ability of game characters, parameters showing the performance of tools used by game characters, and various other types of data. The server 20 also performs processing of notifying users of campaigns provided by the operator of the game to the users, occurrence of problems during the game progress, elimination of such problems, other information related to the operation of the game, and the like.

The game program corresponds, as modes in which users play the game, a mode in which a single user plays the game alone (single play) and another mode in which a plurality of users cooperate with each other in playing the game (multi play). For example, in the game distribution system 1, the server 20 specifies users participating in the game in the multi play mode and communicates with the mobile terminals 10 of the users, for example, thereby providing the users with an environment in which they play the game in the multi play mode.

The game distribution system 1 supporting multi play enables, for example, users to collaborate with each other in fighting against game characters appearing in an action game or a user to play against another user.

<Configuration>

The following describes a hardware configuration of the server 20. The server 20 includes a communication interface (IF) 22, an input/output (I/O) IF 23, a memory 25, a storage 26, and a processor 29, which are connected with each other via a communication bus.

The communication IF 22 supports various types of communication standards such as local area network (LAN) standards, for example, and functions as an interface for transmitting and receiving data to and from the mobile terminal 10 and other external communication equipment.

The I/O IF 23 functions as an interface for receiving input of information in the server 20 and outputting information outside the server 20. The I/O IF 23 includes input reception ports for receiving connection with information input equipment, such as a mouse and a keyboard, and output ports for receiving connection with information output equipment, such as a display for displaying images and the like.

The memory 25 is a storage apparatus for storing data used for processing and the like. The memory 25 provides the processor 29 with a work area that the processor 29 temporarily uses during processing, for example. The memory 25 includes storage apparatuses such as a read only memory (ROM) and a random access memory (RAM).

The storage 26 is a storage apparatus for storing various types of programs and data to be loaded and executed by the processor 29. Examples of the information stored in the storage 26 include game programs, information on game programs, information on users playing game programs, and other information. The storage 26 includes storage apparatuses such as a hard disk drive (HDD) and a flash memory.

The processor 29 loads and executes programs and the like stored in the storage 26, thereby controlling the operation of the server 20. The processor 29 includes, for example, a central processing unit (CPU), a micro processing unit (MPU), and a graphics processing unit (GPU).

Figure 2A:
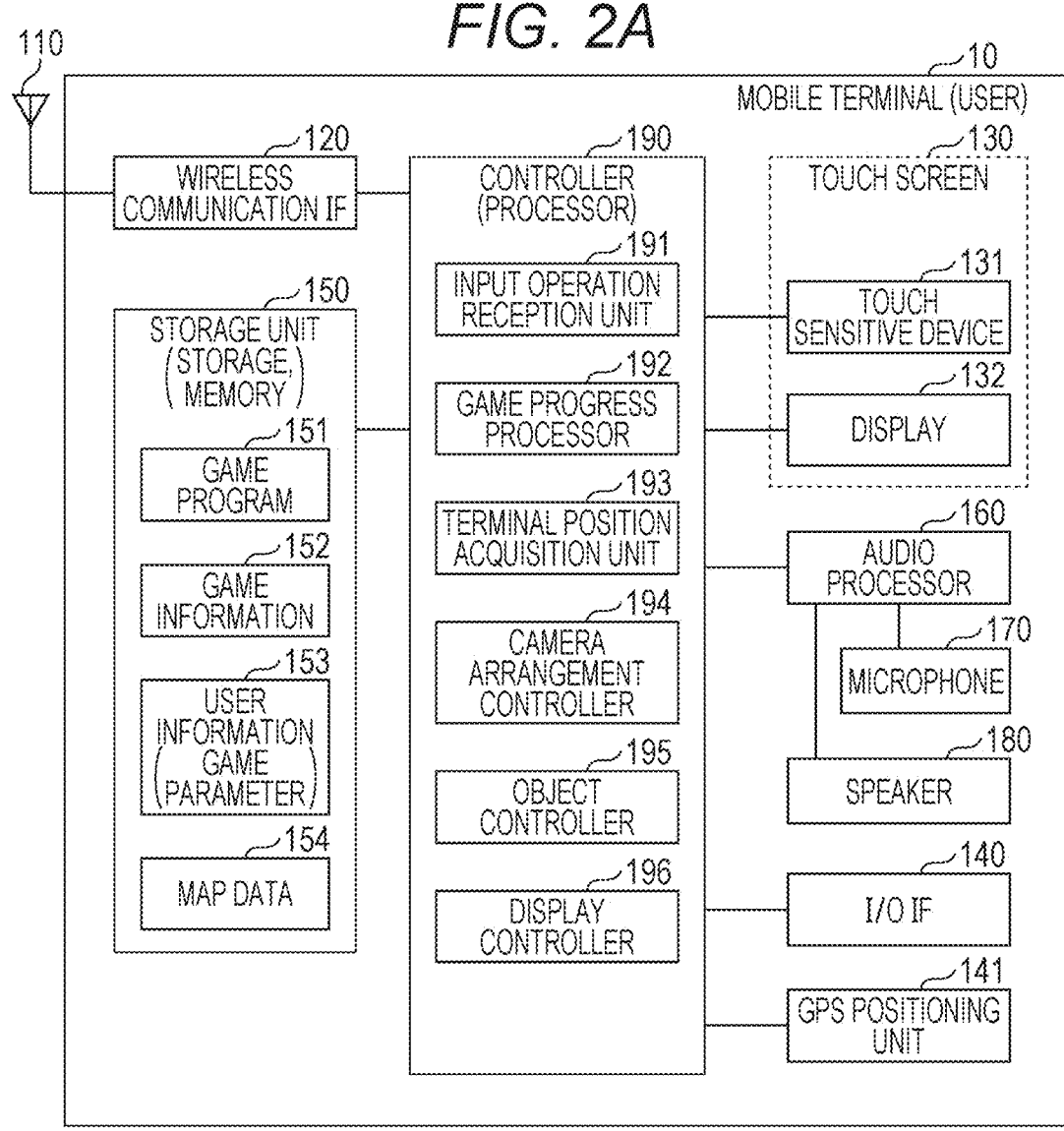
FIG. 2A A block diagram of a functional configuration of a mobile terminal according to at least one embodiment.

FIG. 2A is a block diagram of a configuration of the mobile terminal 10 according to at least one embodiment. With reference to FIG. 2A, the mobile terminal 10 includes an antenna 110, a wireless communication IF 120, a touch screen 130, an I/O IF 140, a storage unit 150, an audio processor 160, a microphone 170, a speaker 180, and a controller 190.

The antenna 110 emits signals from the mobile terminal 10, as radio waves, to the air. The antenna 110 also receives radio waves from the air and provides reception signals to the wireless communication IF 120.

To enable the mobile terminal 10 to communicate with other communication equipment, the wireless communication IF 120 performs modulation and demodulation processing of transmitting and receiving signals through the antenna 110 and the like, for example. The wireless communication IF 120 is a communication module for wireless communications including a tuner and a high-frequency circuit, and performs modulation and demodulation and frequency conversion of wireless signals transmitted and received by the mobile terminal 10 and provides reception signals to the controller 190.

The touch screen 130 receives inputs from the user and outputs information for the user to a display 132. The touch screen 130 includes a member (touch sensitive device 131) for receiving an input operation made by the user. The touch screen 130 also includes a member (display 132) for displaying a menu or game progress on the screen. The touch sensitive device 131 includes a capacitive touch panel, for example, thereby detecting a user's finger or the like approaching the device. The display 132 is implemented by a liquid crystal display (LCD), an organic electroluminescent (EL) display, and a display apparatus of other types, for example.

The I/O IF 140 functions as an interface for receiving input of information in the mobile terminal 10 and outputting information outside the mobile terminal 10.

The GPS positioning unit 141 includes a mechanism for measuring position information on the mobile terminal 10. The GPS positioning unit 141 includes, for example, a global positioning system (GPS) module and measures position information on the mobile terminal 10 based on GPS signals.

The storage unit 150 includes a flash memory or a random access memory (RAM), and stores programs used by the mobile terminal 10 and various types of data received by the mobile terminal 10 from the server 20.

The audio processor 160 performs modulation and demodulation on audio signals. The audio processor 160 modulates signals from the microphone 170 and provides modulated signals to the controller 190. The audio processor 160 also provides audio signals to the speaker 180. The audio processor 160 is implemented by a processor for audio processing, for example. The microphone 170 functions as an audio input unit for receiving audio signals and outputting the signals to the controller 190. The speaker 180 functions as an audio output unit for outputting the audio signals outside the mobile terminal 10.

The controller 190 loads and executes programs stored in the storage unit 150, thereby controlling the operation of the mobile terminal 10. The controller 190 is implemented by an application processor, for example.

The following describes an operation of the mobile terminal 10 executing a game program 151 in greater detail. In an aspect, the storage unit 150 stores the game program 151, game information 152, user information 153, and map data 154. The server 20 communicates with an information processing apparatus distributing map data, thereby receiving map data including information on roads, facilities, and administrative divisions and retains map data used in the game in the storage 26 and the like based on the received map data. The mobile terminal 10 downloads game programs and map data from the server 20 and stores them as the game program 151 and the map data 154 in the storage unit 150, for example. The mobile terminal 10 also communicates with the server 20 along the game progress, and exchanges various types of data such as the game information 152 and the user information 153 with the server 20.

The game program 151 is a program for advancing a game on the mobile terminal 10. The game information 152 includes various types of data referred to by the game program 151. Examples of the game information 152 include information on objects to be arranged in a virtual space in the game and information on effects associated with such objects (including information on skills configured for game characters). The user information 153 includes information on users playing the game. Examples of the user information 153 include information for identifying a user of the mobile terminal 10 playing the game, information for identifying another user cooperating in playing game in the multi play mode, and other information.

The controller 190 loads and executes the game program 151, thereby performing functions of an input operation reception unit 191, a game progress processor 192, a terminal position acquisition unit 193, a camera arrangement controller 194, an object controller 195, and a display controller 196.

The input operation reception unit 191 receives an input operation made by the user, based on output from the touch screen 130. Specifically, the input operation reception unit 191 detects a user's finger or the like approaching the touch sensitive device 131 as coordinates of the coordinate system consisting of the horizontal and vertical axes of the plane of the touch screen 130.

The input operation reception unit 191 senses the user's operation on the touch screen 130. The input operation reception unit 191 senses, for example, (1) "approaching operation", (2) "release operation", (3) "tap operation", (4) "double tap operation", (5) "long-press operation (long-touch operation)", (6) "drag operation (swipe operation)", (7) "move operation", (8) "flick operation", and other operations made by the user. Examples of the user's operation sensed by the input operation reception unit 191 are not limited to the ones listed above. For example, when the touch sensitive device 131 includes a mechanism for detecting the intensity of pressure made by the user pressing down the touch sensitive device 131, the input operation reception unit 191 senses the intensity of pressure made by the user. The controller 190 determines a state with a user's finger or the like approaching the touch screen 130 to be a "touch-on state". The controller 190 determines a state no detected user's finger or the like approaching touch screen 130 to be a "touch-off state". The controller 190 receives coordinates indicating a place that a user's finger or the like and sequentially output from the touch screen 130 as coordinates of "touch now".

In this context, (1) the "approaching operation" refers to an operation made by the user having his or her finger or the like approaching the touch screen 130.

(2) The "release operation" refers to an operation made by the user stopping the operation of having his or her finger or the like approaching the touch screen 130. The input operation reception unit 191 determines the user's operation to be the "release operation", for example, when the user performs an operation of moving his or her finger or the like away from the touch screen 130 with which the finger has brought into contact.

(3) The "tap operation" refers to an operation made by the user, having performed the approaching operation of having his or her finger or the like approaching the touch screen 130, performing the release operation at the same position where the user has performed the approaching operation.

(4) The "double tap operation" refers to an operation made by the user performing the tap operation twice within a certain period of time. The input operation reception unit 191 determines the user's operation to be the "double tap operation", for example, when the input operation reception unit 191 senses another tap operation at the same coordinates of the previous tap operation within a certain period of time after the user's operation was determined to be the tap operation previously.

(5) The "long-press operation" refers to an operation made by the user keeping pressing the touch screen 130. If a time period during which the approaching operation has continued at the same coordinates of the previous approaching operation exceeds a certain period of time after the touch screen 130 detected the user's operation and determined it to be the approaching operation, the touch screen 130 determines that the user's operation to be the "long-press operation" ("long-press operation" may be also referred to as "long-touch operation").

(6) The "drag operation" refers to an operation made by the user sliding his or her finger or the like while maintaining an approaching state of the finger approaching the touch screen 130.

(7) The "move operation" refers to a series of operations made by the user maintaining the approaching operation on the touch screen 130 and moving the position where his or her finger or the like approaches on the touch screen 130 to perform a release operation.

(8) The "flick operation" refers to an operation made by the user performing a move operation in a shorter period of time than a predetermined period. The flick operation is an operation made by the user striking the touch screen 130 with a quick movement of his or her finger.

The game progress processor 192 calls various types of programs in accordance with the user's operation, for example, thereby performing processing of advancing the game. For example, the game progress processor 192 performs processing of transmitting position information on the mobile terminal 10 as a user position to the server 20 and configuring game parameters in accordance with the user position, processing of communicating with the server 20 and managing a group (also referred to as "party") including a plurality of users to enable a user to cooperate with other users in playing an event (also referred to as "quest") provided in the game, and various other types of processing. Specifically, the game progress processor performs processing of transmitting data to the server 20 in accordance with the game progress, processing of receiving data related to the game from the server 20, processing of giving a compensation to the user in accordance with the game progress, processing of measuring an elapse of time, and other types of processing.

Figure 2B:
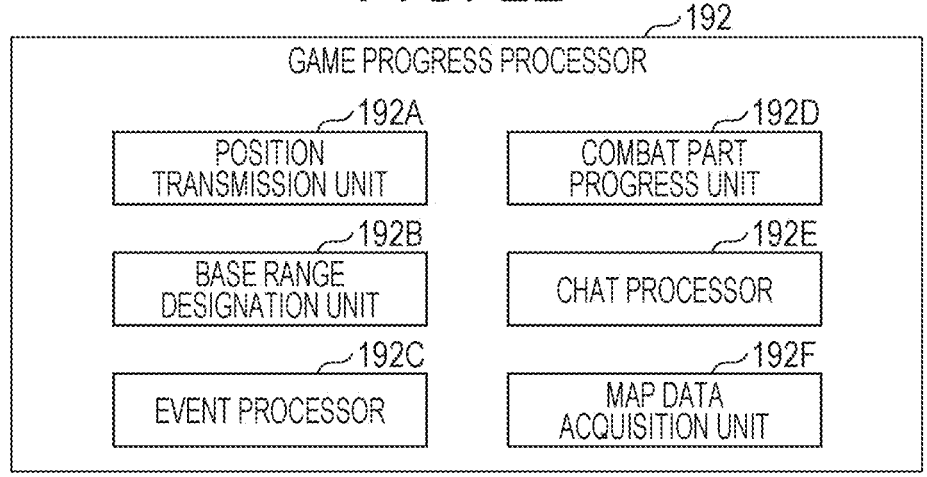
FIG. 2B A block diagram of a functional configuration of a game progress processor according to at least one embodiment.

FIG. 2B is a block diagram of a game progress processor 192 according to at least one embodiment. More specifically, the controller 190 loads and executes the game program 151 in storage unit 150, whereby the game progress processor 192 performs functions of a position transmission unit 192A, a base range designation unit 192B, an event processor 192C, a combat part 192D, a chat processor 192E, a map data acquisition unit 192F, and the like.

The position transmission unit 192A performs processing of acquiring the user position through the terminal position acquisition unit 193 and transmitting the acquired user position to an apparatus outside the server 20 or the like.

The base range designation unit 192B performs processing of receiving an input operation made by the user for designating a certain position range, in map data used in the game program 151, that enables the user existing therein to have game parameters configured, processing of setting the position range for the user based on the received input operation, and other types of processing. For example, when the game program 151 is a role playing game using position information, virtual facilities in the game program 151 are arranged in the certain position range designated by the user in the map data.

Virtual facilities in the game program 151 are associated with functions for configuring game parameters. Thus, each facility has an attribute, and the user may designate any one (or more) of the attributes in association with the position range that the user may designate. Examples of the virtual facilities include a facility (with the attribute of facility "inn") for restoring physical power or the like of characters operated by the user, a facility (facility "weapon shop" or facility "protector shop") for changing game parameters in association with characters operated by the user, a facility (facility "tool shop") for associating game items with characters operated by the user, a facility for eliminating abnormal conditions of characters operated by the user, a facility for changing occupations of characters operated by the user, a facility for enabling the user to incorporate another character in a party organization, a facility for enabling the user to incorporate a character appearing as an enemy character in a party organization as an operation character, and other types of facilities. Examples of the abnormal conditions include (1) a condition in which the physical power of characters drops as time elapses (also referred to as "poisoned condition"), (2) a condition in which characters retain their physical power values but are unable to conduct attacks and other actions (also referred to as "paralyzed condition"), (3-1) a condition in which characters are unable to execute certain commands, (3-2) a condition in which characters may operate in a different way from the way designated by the user (also referred to as "cursed condition"), (4) a condition in which characters are unable to restore their physical power values by use of usual restoration items, and various other types of conditions. Some facilities may have a plurality of attributes (for example, a facility for restoring parameters related to physical power or the like and restoring abnormal conditions such as the poisoned condition).

In this manner, the game program 151 enables the setting of the above-described virtual facilities designated by the user in the map data. Furthermore, for example, what the user sets in the map data may be an area including a plurality of facilities (for example, an entire town including a plurality of facilities such as an inn and a weapon shop). For example, in the map data, the user may designate the setting of a town where a game scenario in the game program 151 begins in a certain range including the location of the user's house. This operation enables the user to have the surrounding area of his or her house included in a specific position range that enables the user existing therein to have game parameters configured. Thus, for example, every time the user comes back home, the physical power of game characters may be restored through the use of an inn in the game.

In at least one embodiment, the base range designation unit 192B may receive an operation of designating certain position ranges in which game parameters are configurable in the map data from the user (for example, an operation made by the user setting a facility "inn" at a location in the map data, and an operation made by the user setting a facility "weapon shop" at another location in the map data) such that the position ranges designated for these facilities will be located at least at a certain interval. For example, the user's designation is received on the position ranges in which game parameters are configurable such that the facilities will be located with at least a certain predetermined distance therebetween (examples of the interval between the facilities include, but are not limited to, at least several hundred meters, several kilometers, or several tens of kilometers). For specific facilities, the user may be allowed to designate the positions of these facilities in the map data irrespective of the interval for which designation on the facilities is received. For example, for facilities "inn" and other specific facilities, the user may be allowed to designate the positions of these facilities in the map data irrespective of the interval at which the facilities can be provided. For specific locations, the user may be allowed to designate the positions of these facilities in the map data irrespective of the interval for which designation on the facilities is received. For example, for the location of a house, the user may be allowed to provide a certain facility such as an inn irrespective of the interval at which the facilities can be provided. In this manner, at a house and other location at which the user frequently exists, the user may be allowed to designate facilities in the house game associated with the location, which increases opportunities for advancing the game and further enhances attractiveness.

The base range designation unit 192B may receive an operation of designating certain position ranges in which game parameters are configurable in the map data from the user, such that the user's travel time will be at least a certain period when designating the position ranges for respective facilities at least at a certain interval in the map data. For example, if a position range the user has designated in the map data includes a departure and arrival location of a public transportation service (a train station, a bus stop, etc.), the user's designation on the position ranges is received at least at a distance, as the above-described certain interval, based on the travel speed set for the public transportation service (for example, several tens of kilometers per hour for a train) and a predetermined travel time (for example, a travel time of at least several minutes, several tens of minutes, or several hours). The travel time of each public transportation service may refer to its timetable or the like. For example, if the user designates a first station as a certain position range (for example, at which an inn or the like is located), the user may be allowed to designate a station that requires a travel time of at least a certain period from the first station as a certain position range (for example, at which a weapon shop or the like is located). In this manner, the user is encouraged to move through the game, which provides attractiveness through the user's movement in the game play and the real world.

The base range designation unit 192B may receive the user's designation on the attributes of the facilities (the user's designation on whether an inn is located and whether a weapon shop is located) and designate the position range in the map data such that the attributes of the facilities the user may designate will be changed in accordance with the progress status of the game play by the user. For example, an event, out of the events provided to the user in the game program, may be related to the story progress. The server 20 may provide the user with events in accordance with the progress status of the story as the user successfully finishes the event related to the story progress. Thus, the server 20 manages the progress status of the story as the degree of successfully finishing the event related to the story progress. In this context, the attributes of the facilities the user may designate may be expanded in accordance with the status in which the user has successfully finished a series of events related to the story progress. This enables the user who has advanced the story further to designate position ranges in which more facilities are located in the map data. For example, the user may designate the following facilities in the map data as the user advances the story: facilities in which occupations of characters operated by the user may be changed, facilities in which the user may incorporate another character in a party organization (for example, also referred to as facility "bar"), facilities in which the user may incorporate a character appearing as an enemy character in a party organization as an operation character, facilities with a certain area, such as a cave, in which enemy characters appear (for example, also referred to as facility "dungeon"), and various other types of facilities. This may further enhance the attractiveness of the game. For example, when the user designates a certain range in which a facility "dungeon" is located in the map data, the game program provides the user existing in the certain range in which the facility "dungeon" is located with a game part for playing the facility "dungeon". In the game part for playing the facility "dungeon", the game program causes game characters to move in a certain range in which they are movable, such as in a cave (which should not be construed in a limiting sense and may be replaced with a building or the like), for example, in accordance with an input operation such as a tap operation, and causes random encounter with enemy monsters. In the facility "dungeon", the user is provided with opportunities to encounter with relatively a strong enemy character (also referred to as a "boss character"). If the user successfully defeats the boss character through an input operation, the user is given compensations such as an item or an event taking place when the boss character is defeated.

Examples of the occupations of characters operated by the user include an occupational type that is good at attacking with a sword, its fists, or the like, an occupational type that is good at attacking or promoting recovery with magic or the like, and an occupational type that acquires various types of skills irrespective of combat event (for example, a skill for exploring whether a treasure box that enables acquisition of an item exists in a certain range, a skill for raising the encountering rate with enemy characters, and a skill for helping the user get out of the dungeon or the like). The game characters may have, in addition to their levels enhanced by experience points acquired by defeating enemy characters, occupational levels, which may be enhanced. For example, the level of each occupation may have an upper limit, and enhancement of the level of the occupation may enable the corresponding game character to have a skill specific for the character's occupation (for example, as for an occupation "warrior" or an occupation "martial artist", a skill for giving enemy characters comparatively large damage or a skill for attacking a plurality of enemy characters). In this context, if the user designates the certain range of a facility in which the occupations of characters operated by the user may be changed (for example, a facility called "job change site") in the map data, the user may exist in the certain range for changing the occupations of the characters, which further enhances the attractiveness of the game. The skills acquired by enhancement of the level of the occupation may be effective even after a change of occupations.

The user may be enabled to designate a certain range of the facility in which another character may be incorporated in a party organization in the map data, on the condition that the game play has advanced to a certain degree. Furthermore, once the facility in which another character may be incorporated in a party organization can be provided, an event for enabling the user to acquire other characters (for example, in the map data, the user moves to a location to exist there, and performs a combat event with a character in the game, whereby the user may acquire this character) may be set.

Characters appearing as enemy characters may include ones that are obtainable as characters operated by the user. For example, after a combat event is successfully finished, whether the user is able to make a friend of an enemy character may be decided in a drawing. Alternatively, the user may be limited to make friends of enemy characters until the game is advanced to a certain extent. In this case, on the condition that events related to the story progress are advanced to a certain extent as the user performs the game play, the user may be enabled to acquire characters appearing as enemy characters, or the user may be enabled to designate a certain range of the facility for enabling the user to incorporate characters appearing as enemy characters in a party organization as operation characters in the map data. The enemy characters acquired by the user may be incorporated in a party organization together with other operation characters during the play of an event. The enemy characters acquired by the user may acquire, like other operation characters, experience points or the like and have their levels enhanced, such that skills specific to these enemy characters may be acquired (for example, as for a fire-breathing enemy character, a flame-based attack skill). Furthermore, the game program may have a game mode that enables a battle between enemy characters acquired by the user.

The base range designation unit 192B may receive re-designation on where to designate in the map data, as for the designated position range designated by the user in the map data, if a certain condition is satisfied. The certain condition is, for example, the elapse of a certain period of time (for example, several days) after the user previously designated the position range. For example, the user who designated a facility "weapon shop" or the like in the map data may want to re-designate a more preferable position range, or if the situations related to the user's travel range may change to at least a certain extent due to a short-term or long-term business trip, the user's moving, or the like. Even in such cases, attractiveness of the game may be provided.

The base range designation unit 192B may designate a position range in the map data only during a certain period of time. For example, the previously designated position range may be re-designated during a certain period of time, in accordance with the user's schedule data including flight information, business trip destination information, and trip destination information.

The event processor 192C associates the user and events (also referred to as "quests") occurring in the game program 151, thereby advancing the game play of events performed by the user. Some of these events are targeted for all users participating in the game (for example, a tutorial event for facilitating users to learn the game play, an event given to users automatically along with the users' story progress, and other types of events), other events are given randomly to users. Some of these events require users to go to a specific location in the map data, as a finish condition. Other event finish conditions require users to go to a specific location and win a combat event with a specific character that the users are allowed to combat at the specific location. Some of these events enable participation of a plurality of players. In such an event, a plurality of users can exist at a specific location designated in the event and thus may be enabled to perform the game play. This enables a plurality of players to move and enjoy the game together, which further enhances attractiveness. Examples of the events enabling the play of a plurality of players may include events that enable participation of other players designated by a player and events that enable a call for participation of non-specific players. For example, when the user designates the certain range of a facility in which the user may incorporate other characters in a party organization (the above-mentioned facility "bar", etc.) in the map data, the user may be enabled to call for participation of non-specific players.

The combat part progress unit 192D performs processing of advancing a combat part in opportunities in which characters operated by the user combat enemy characters. For example, the mobile terminal 10 may periodically transmit the user position acquired by the terminal position acquisition unit 193 to the server 20, and the server 20 may cause a combat part as if the user moves and encounters enemy characters. A combat part in which characters operated by the user combat enemy characters may be advanced automatically without the user's intervention through an input operation, for example. For example, winning or losing of a combat part may be determined based on game parameters of characters operated by the user (physical power value, offensive capability value, defensive capability value, parameters for exerting skills, and other parameters), parameters of enemy characters, action policy followed by the user's characters to automatically advance combats (policy for controlling artificial intelligence (AI) in accordance with action patterns such as attack-oriented or recovery-oriented), and algorithms for causing enemy characters to perform combats. In a combat event, an input operation from the user may be received to perform a combat against enemy characters. For example, during an auto-battle combat, intervention for a manual operation made by the user may be received. In addition, while encounter with enemy characters takes place as the user moves, in an auto-battle combat, the history combat results may be recorded and the user may be enabled to refer to the history combat results in accordance with the user's input operation. Thus, the user is enabled to perform combat events with enemy characters as the user moves without making any input operation to the mobile terminal 10 and develop operation characters, for example, whereby the user may acquire events or the like as the user successfully finishes the combat events. In this case, the user may designate a combat event in the history combat results to enable another battle. For example, even if operation characters have used up their physical power values and are defeated in a combat event (the user fail to acquire experience points and items of such operation characters), the user may re-designate and perform the combat event again. In this manner, for example, the user who has lost an opportunity to acquire experience points or the like in a defeated auto-battle with a strong enemy character may make another try to combat the enemy, which further enhances the user's satisfaction.

After combat, an operation for recovering parameters of the user's characters may be performed automatically without requiring the user's input operation (for example, an auto-battle combat part may be followed by automatic use of a tool or a magic word for recovering physical power values decreased in the combat part).

If the user's operation characters use up their physical power values in a combat event, no encounter with enemy characters may take place until the physical power values are recovered (no opportunities for acquiring experience points, events, and the like by defeating enemy characters may be provided until the physical power values are recovered). In this case, even if operation characters use up their physical power values, the physical power values may be recovered to a certain extent by elapse of a certain period of time (for example, several tens of minutes or several hours) after the physical power values were used up.

Some events enable a combat against enemy characters, in cooperation with a plurality of players. The combat part progress unit 192D may determine operations of characters in a combat part, based on an increase or decrease in game parameters of other friend characters.

The chat processor 192E performs processing of exchanging a chat between players.

The map data acquisition unit 192F performs processing of the mobile terminal 10 receiving map data used along with the execution of the game program 151 from the server 20. For example, the position information on the mobile terminal 10 is transmitted to the server 20, whereby map data around the position information of the mobile terminal 10 may be received from the server 20.

The game progress processor 192 performs processing of updating game parameters for the user in accordance with the game play of the user in this manner. The game progress processor 192 may enable the user to execute a specific command in the game in accordance with the game play of the user. For example, a specific command may be enabled in accordance with enhancement of levels of game characters that are caused to defeat enemy characters and acquire experience points and other parameters, or a specific command may be enabled along the event progress related to the story progress. The game progress processor 192 may receive execution of a specific command from the user, thereby advancing the game such that the user's game parameter is configurable even if the user position is not included in the position range of the user's designation, as in the case in which the position range includes the user position. For example, when the position range of the facility "inn" is designated to include the location of the user's house, even if the user does not exist in the position range, execution of a specific command (for example, a command indicating teleportation to a facility in a town or the like that is far from the current location) may be received from the user, whereby the effects provided by the facility may be reflected in game parameters.

The terminal position acquisition unit 193 performs processing of acquiring a user position. The user position means, for example, position information specified with longitude and latitude or information on the address of a facility at which the user exists. The terminal position acquisition unit 193 acquires, for example, information on the longitude and latitude of the mobile terminal 10, as the user position, based on output from the GPS positioning unit 141. The terminal position acquisition unit 193 may communicate with another apparatus through near field wireless communications such as NFC, and acquire information on the position at which the other apparatus is installed from the other apparatus. Furthermore, for example, the mobile terminal 10 includes an IC chip that supports NFC or is configured to communicate with a device equipped with an IC chip. When the user carrying the IC chip passes through a gate of a public transportation service and information on the departure or arrival station is recorded in the IC chip, the mobile terminal 10 may acquire the usage situations of the public transportation service recorded in the IC chip (the name of departure or arrival station, the time required for departure or arrival, etc.), thereby acquiring the user position. Examples of the locations that enable communications with the IC chip are not limited to public transportation services and the like, and may include locations at which settlement terminals are installed such as convenience stores, restaurants, electronics retail stores, take-out shops, and other retail shops. Performing settlement processing with the use of the IC chip enables accumulation of information on when and which store the user (which place) performed consuming activities in a server or the like that manages the settlement processing. When the user charges electronic money recorded in the IC chip, information on when and which place (in a convenience store, in a station, etc.) it was charged is recorded in the server or the like that manages the electronic money. In this manner, the user position may be acquired based on the usage state of near field wireless communications such as NFC. Furthermore, the terminal position acquisition unit 193 may acquire the user position in accordance with the communication state between the mobile terminal 10 and a wireless LAN access point.

The camera arrangement controller 194 determines how to show the objects arranged in a virtual space to the user. Specifically, the camera arrangement controller 194 controls the arrangement (camerawork) of virtual cameras in a virtual space executed by the controller 190 loading the game program 151. The controller 190 displays images taken with virtual cameras in the virtual space on the display 132, thereby providing the user with an environment in which the user plays the game.

The object controller 195 controls processing including generation, deformation, and movement of various types of objects appearing in the game advanced by the mobile terminal 10 executing the game program 151, and of various types of objects (for example, a graphical user interface (GUI) screen) generated based on the content of the user's operation received by the input operation reception unit 191. The object controller 195 generates an object indicating the movement direction of a game character based on an input operation on the touch screen 130 made by the user to move the game character and deforms the generated object, for example.

The display controller 196 outputs images in accordance with the camerawork of virtual cameras to the display 132. The display controller 196 determines display content on the display 132 in accordance with the arrangement of virtual cameras in the virtual space, and outputs various types of information such as images and texts in accordance with the determined display content on the display 132.

As the user has his or her finger approaching the touch screen 130 from a state in which the user's finger is away from the touch screen 130, the input operation reception unit 191 detects the user's finger approaching the touch sensitive device 131 at certain coordinates. The coordinates serve as an initial touch position at which when the user performs a drag operation, the mobile terminal 10 detects the movement direction of a game character based on the coordinates of the initial touch position and detection results of the touch screen 130.

Figure 3A:
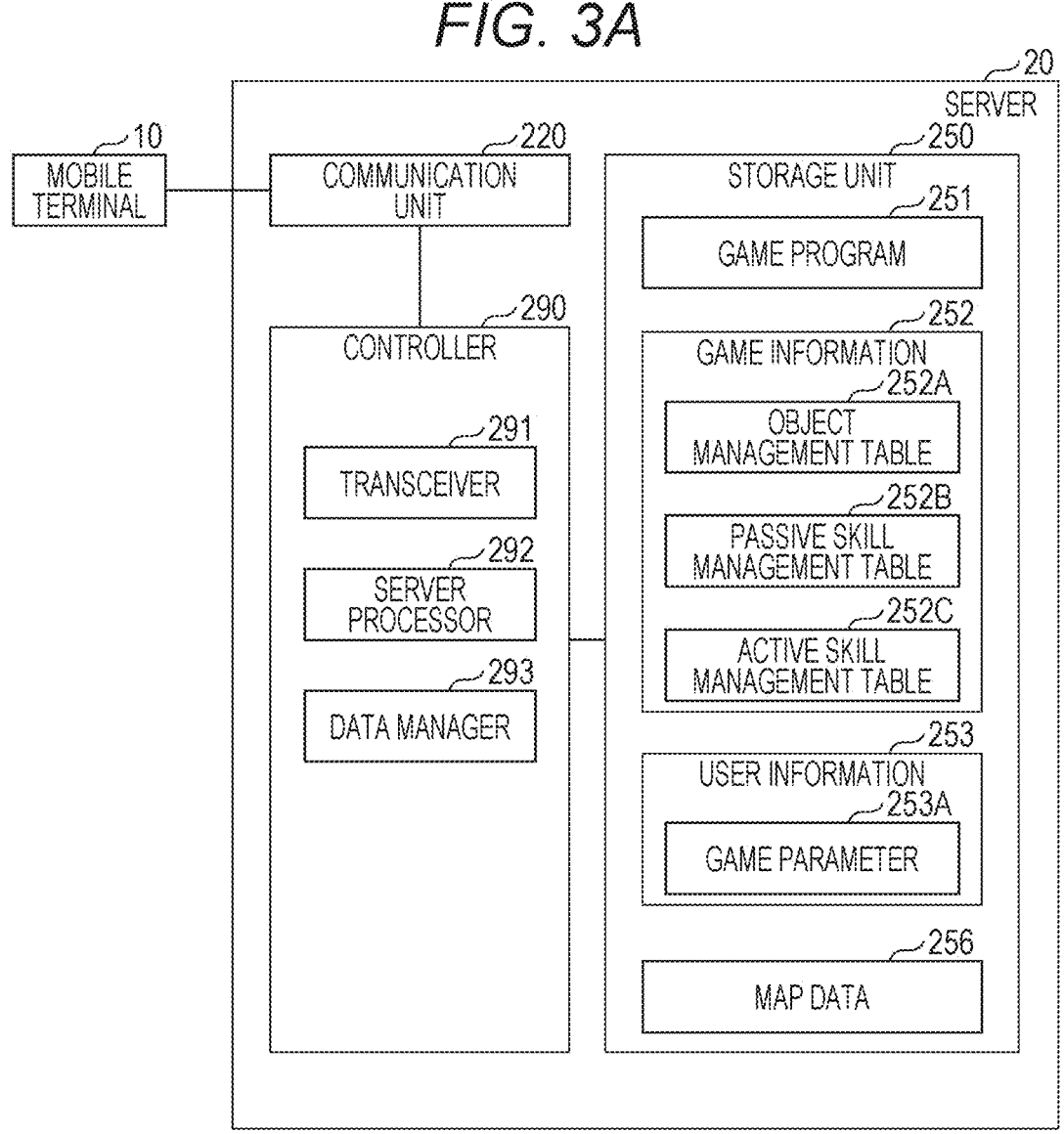
FIG. 3A A block diagram of a functional configuration of a server according to at least one embodiment.

FIG. 3A is a block diagram of a functional configuration of the server 20 according to at least one embodiment. Referring to FIG. 3A, the following describes a detailed configuration of the server 20. In FIG. 3A, the server 20 operate in accordance with programs, thereby performing functions of a communication unit 220, a storage unit 250, and a controller 290.

The communication unit 220 functions as an interface that enables the server 20 to communicate with the mobile terminal 10 and other external communication equipment.

The storage unit 250 stores various types of programs and data that enables the user to advance the game with the mobile terminal 10. In an aspect, the storage unit 250 stores a game program 251, game information 252, user information 253, and map data 256.

The game program 251 is a program that enables the server 20 to communicate with the mobile terminal 10, whereby the game is advanced with the mobile terminal 10. The game program 251 refers to the game information 252, the user information 253, and the like that are various types of data for advancing the game, thereby advancing the game in accordance with an input operation from the user. The game program 251 is executed by the controller 290, thereby causing the server 20 to perform processing of exchanging data with the mobile terminal 10, processing of advancing the game in accordance with the operation content made by the user carrying the mobile terminal 10, processing of updating information on the user playing the game, and other types of processing.

The game information 252 includes various types of data referred to by the game program 251. The game information 252 includes an object management table 252A, a passive skill management table 252B, and an active skill management table 252C.

The object management table 252A indicates configurations of objects located in the virtual space of the game. The mobile terminal 10 executes the game program 151 and displays images of objects in the virtual space taken with virtual cameras on the display 132, thereby advancing the game.

Examples of the objects include objects indicating game characters operated by the user, objects indicating wearing objects worn by game characters, objects indicating enemy characters, objects indicating facilities in which game parameters can be updated, and various other types of objects. The controller 190 performs processing associated with these objects, once the user performs a predetermined input operation on the touch screen 130, a certain condition is satisfied along the game progress, or various other events take place.

For example, when the user performs an approaching operation to an object on the touch screen 130, the controller 190 brings the object into a state selected by the user. Furthermore, for example, the controller 190 receives a drag operation from the user, thereby performing processing to move an object that the user is intended to move, in accordance with the user's input operation. Alternatively, for example, the controller 190 receives a touch operation on an object made by the user, thereby performing processing of giving a compensation to the user for advantageously advancing the game.

In the passive skill management table 252B, information for identifying objects is associated with information on passive skills associated with these objects. The passive skills used herein mean, for example, skills exerted when a predetermined condition is satisfied in the game and enabling the user to advantageously advance the game. For example, when a passive skill is exerted, an effect of advantageously advancing the game, such as an increased travel speed of a character, is exerted.

In the active skill management table 252C, information for identifying objects is associated with information on active skills associated with these objects. The active skills used herein mean, for example, skills that become exertable when a predetermined condition is satisfied in the game and enabling the user to advantageously advance the game upon reception of an input operation from the user for exerting the skill.

The user information 253 is information on the user playing the game. The user information 253 includes game parameters 253A. The game parameters 253A include information for identifying each user, information for indicating range designated by each of the users in the map data (where to locate a town in the map data, etc.), information for indicating the user's degree of advancement of a specific event related to the story progress in the game, items owned by the user in the game, game characters, information on wearing objects used by game characters, and other types of information.

The map data 256 is generated for use in execution of the game program 251, based on map information accumulated in the storage unit 250 by the server 20 communicating with an external server distributing the map data.

The controller 290 executes the game program 251 stored in the storage unit 250, thereby performing functions of a transceiver 291, a server processor 292, and a data manager 293.

The transceiver 291 receives various types of information from the mobile terminal 10 executing the game program 151 and transmits various types of information to the mobile terminal 10. The server 20 exchanges various types of information with the mobile terminal 10 including: receiving information for indicating the user position from the mobile terminal 10; transmitting data including the surroundings of the user position in the map data to the mobile terminal 10, based on the received information for indicating the user position; generating enemy characters the user will randomly encounter, based on information for indicating the user position, and transmitting information on the generated enemy characters to the mobile terminal 10.

The server processor 292 controls the entire operation of the server 20 and calls various types of programs, for example, thereby performing processing required for the game progress. For example, the server processor 292 updates the game information 252, the user information 253, and other data based on the information received from the mobile terminal 10 and transmits various types of data to the mobile terminal 10, thereby advancing the game.

The data manager 293 performs, in accordance with processing results of the server processor 292, processing of updating various types of data stored in the storage unit 250, processing of adding/updating/deleting records in a database, and other types of processing.

Figure 3B:
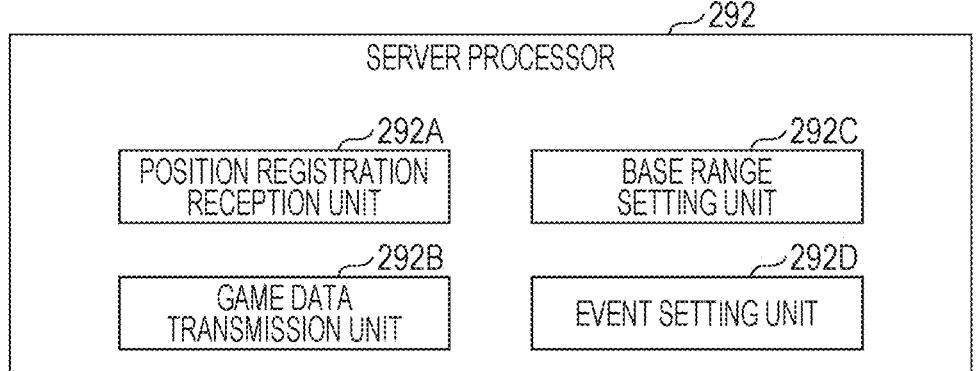
FIG. 3B A block diagram of a functional configuration of a server processor according to at least one embodiment.

FIG. 3B is a detailed functional configuration of the server processor 292 according to at least one embodiment. The server processor 292 performs various types of processing on a position registration reception unit 292A, a game data transmission unit 292B, a base range setting unit 292C, and an event setting unit 292D.

The position registration reception unit 292A registers information on when and where the user existed during the game in a database. Reception results of information on the user position transmitted from the mobile terminal 10 are registered in the storage unit 250, in association with the corresponding user.

The game data transmission unit 292B transmits various types of game data along the game progress generated in accordance with the user position to the mobile terminal 10 of the corresponding user.

The base range setting unit 292C receives information on ranges of virtual facilities in the game designated by the user in the map data from the mobile terminal 10 and registers the information in a database.

The event setting unit 292D performs processing of determining whether to give the user any event and what type of event to be given to the user, based on a registration status of information on the user position, a play status of quests by the user, and other information. For example, the event setting unit 292D performs processing of successively transmitting enemy characters the user will randomly encounter in association with the map data to the mobile terminal 10 based on information on the user position transmitted from the mobile terminal 10, and processing of determining the content of an event to be acquired by the user as a compensation for defeating an enemy character in the combat part. (The content of the event includes, for example, the user going to a certain building within a certain distance from a location where the user acquired the event. In this case, depending on the location where the user acquired the event, a location is set at which the user aims as a determination.) Thus, the server 20 causes a combat event for the user, in the map data used in the game, when a position at which a combat event is caused to combat against an enemy character and the user position registered by the position registration reception unit 292A satisfy a certain positional relation (within a certain distance, etc.). The event setting unit 292D gives the user an event based on, for example, event probability as a result of advancement of the combat event based on the user's operation (the user may acquire some events after the end of the combat event). In this context, events associated with the user through playing of the combat event may include events related to the story progress. This enables, for example, the user to play the game in his or her daily travel distance, defeat enemy characters in the combat event to have game characters acquiring experience point and the like, to find attractiveness from development of game characters and the like, and acquire events related to the story progress. In this manner, the user may be provided with attractiveness of playing the game as a main character of an adventure or other story, while the user is moving.

The event setting unit 292D may set a target point in an event to be given to the user based on the information on the user position in giving the event. The server 20 retains, in a database, candidates for target points in events in the map data beforehand. For example, objects that are highly likely to exist in any region as candidates for target points. Examples of such candidates for target points include community facilities (city office, town office, schools, parks) and public transportation service facilities (stations) that are likely to exist in any municipality. The event setting unit 292D, for example, when giving an event to the user who has successfully finished a combat event, selects a target point based on the user position and gives the user an event including the selected target point. The event setting unit 292D may, when giving an event to the user, based on the difficulty of the event and the probability (rarity) of the event, determine a target point to be included in the event, out of the candidates for a plurality of target points based on the user position. For example, for an event with low difficulty (for example, when the level of an enemy character to be defeated in the event is comparatively low), a target point that is comparatively near the user position may be selected. For example, for an event with high rarity, which has comparatively low event probability (an event to defeat a special boss character, etc.), a target point that is comparatively far from the user position may be selected, out of the candidates for target points based on the user position. Examples of the content of the event include: an event that urges the user to go to a specific location in the map data and wage combat against a specific enemy character there (for example, an event urges the user to go to a landmark building where a boss character has appeared and wage combat against the boss character, and the event successfully finishes as the user defeats the boss character), an event that urges the user to play in a dungeon created at a specific location in the map data, and an event that indicates appearance of a specific character at a specific location in the map data (for example, the user who has moved to a position that is far from the user position and at which a character with high rarity exists is allowed to acquire the character). In these cases, for example, the mobile terminal 10 acquires the position of the user playing the event from the terminal position acquisition unit 193 or the like, refers to the acquired user position and determines whether the user is at the target point designated in the event, disables playing of the event when determining that the user is not at the target point, and enables playing of the event when determining that the user is at the target point.

The event setting unit 292D may give the user an event including a plurality of events (each of the plurality of events included in the event may also be referred to as a "subquest"). In the game program, the event is seen as being successfully finished as the user successfully finish this series of subquests. In this context, the game program may make a part of the subquests available to the user and the remaining subquests unavailable to the user just after the user has started playing the event, and as the user advances subquests, present playable subquests one after another to the user. The subquests each include a target point. The user successively moves to the target points of the subquests included in the event to successfully finish the subquests, thereby playing the event.

In the game program, an event is coupled with another event to be provided to the user. In this case, the game program may provide, once the user successfully finishes a subquest included in an event, another event (including a plurality of subquests).

The configurations of the game distribution system 1 according to at least one embodiment have been described. In at least one embodiment, the game program 151 is, for example, a role playing game that specifies the user position in the map data based on the position information of the mobile terminal 10 or the like and advances the game in accordance with the specified position, or other types of game.

In some instances, a role playing game urges playerscharacters to move in a field map, causes events at various facilities such as castles and towns in the game, and enables players to acquire weapons protectors, and other equipment items and tool items. Examples of the tool items include: items for recovering physical power parameters (for example, medical plants); items for recovering game points consumed in exerting various skills such as magic words or magic; items for exerting the effect of moving from a town to another town; items for exerting the effect of getting back to an entrance of a dungeon or the like; items for eliminating abnormal conditions (poisoned condition, paralyzed condition, cursed condition, and other abnormal conditions) of players-characters; items for controlling the encountering rate with enemy characters (lowering or raising the encountering rate); items for nullifying changes in game parameters even if players-characters are moved to an area for changing the game parameters in the field (for example, items for freeing players-characters from loss of physical power values even if they are moved to an area for decreasing the physical power values such as poisonous swamps and barrier regions); and various other types of items. In some instances, a role playing game has a component for expanding means for transportation of players-characters. Examples of the component for expanding means for transportation of players-characters include a component for enabling players-characters to move areas in which they are not able to move on foot (for example, seas and high mountains) on a ride (a ship or an airplane appearing in the game). A typical role playing game enables players-characters to move in an area by obtaining a certain item. For example, an area in which players-characters are movable may be expanded by obtaining a key or other special item, or a gatekeeper may open a road to a new area as the progress of events in the game.

In at least one embodiment, the game is advanced in accordance with the user position, such as the position information of the mobile terminal 10. For example, the game program causes an encounter with enemy characters in accordance with the user position. Furthermore, for example, when the user moves to a position designated by the user to provide a virtual facility in which game parameters are configurable in the map data, the game program sets game parameters that are configurable at the facility for the user (for example, the physical power of a player-character is recovered when the user moves to a position designated by the user to provide an inn). For example, the game program urges the user to cause various events in accordance with the game progress. In some of these events, the user goes to a specific location or a facility in the map data to defeat a boss character or acquire an item, thereby advancing the game. When the user moves to positions indicated in these events, game parameters are set for the user.

In this manner, when the user specifies a position range in which facilities in the game are provided in the map data, for example, the user may advance the game based on his or her activity range in a daily life. Thus, moving in a daily life may enhance attractiveness provided by the game program.

With reference to FIG. 4 to FIG. 7, the following describes a data structure of data used in an apparatus executing the game program 251 or the game program 151.

Figure 4:
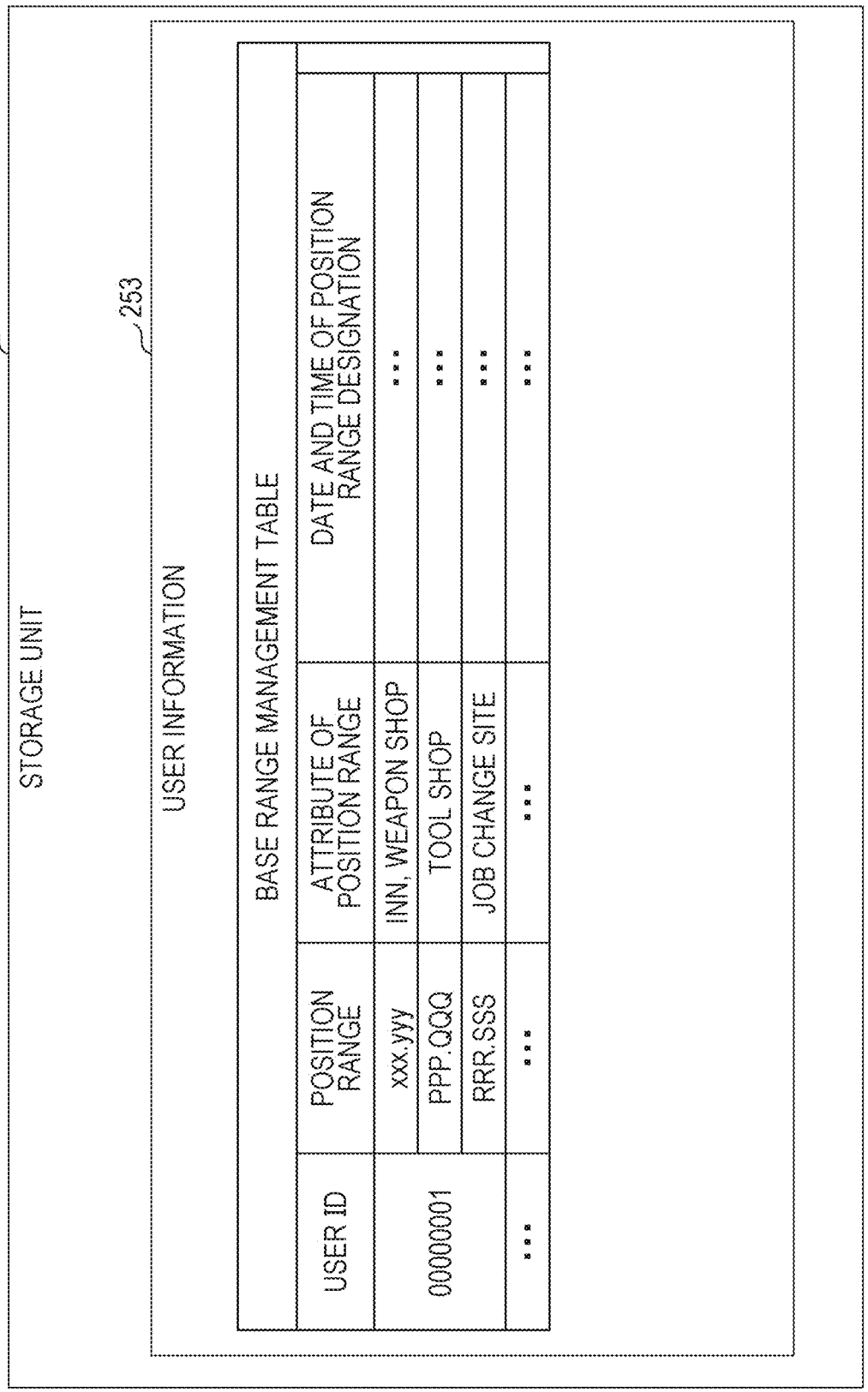
FIG. 4 A diagram of a data structure of a table for the server to manage a position range designated on map data by users, as user information, according to at least one embodiment.

FIG. 4 is a diagram of a data structure of a table for the server 20 to manage a position range designated on map data by users, as user information 253, according to at least one embodiment.

In FIG. 4, the user information 253 includes a base range management table for managing the position range designated by the user in the map data. The base range management table includes, as table items, information for identifying each user, information for indicating a position range designated in the map data used by the user in the game program, information for indicating attributes of the position range designated by the user, and information for indicating the date and time when the user designated the position range. In this manner, different users may designate different position ranges in the map data. The user designates the position range with an attribute associated therewith, the user him/herself may provide a facility corresponding to the attribute in the map data. This provides the user with an experience of creating a town in a role playing game in the map data by him/herself. Since each user retains the date and time when the user designated the position range in the map data in the base range management table, for example, by elapse of a certain period of time after the user designated the position range, the server 20 may receive re-designation from the user on which part of the map data the position range is designated as for the already designated position range. A plurality of facilities may be set for a position range (in other words, the user may designate a base (a castle, a town, etc.) including a plurality of facilities in the map data).

FIG. 5 is a diagram of a data structure of a table for the server 20 to manage a progress status in which users have advanced a game, as user information 253, according to at least one embodiment.

In FIG. 5, the user information 253 includes a game progress status management table indicating the progress status of the game of each user. The game progress status management table includes, as table items, information for identifying each user, information for indicating experience point parameters of each user's operation characters, story-level information for indicating a history of the user playing events related to the story progress, information for indicating events given to each user, money information for indicating currency possession parameters in the game each user has earned through the game play, information for indicating items owned by each user in the game, information for indicating candidate characters each user may use for organizing a party, and information for indicating candidate characters each user may use for organizing a party among enemy characters.

In this context, the number of events associated with the server 20 may have an upper limit for each user. Thus, the number of playable events may have an upper limit for each user, such that no new event will be given unless the current event is successfully finished. The upper limit of the number of events ownable by each user may be expanded, for example, in accordance with an input operation from the user for expanding the upper limit of ownable events. For example, when the number of events ownable by each user has an upper limit, users with a higher upper limit of ownable events have higher convenience for playing playable events alone while saving events playable in cooperation with other users.

The information for indicating experience point parameters of the user's operation characters include cumulative values of experience points the user acquired by successfully finishing a quest and level values depending on the cumulative values of the experience points. For example, each time the user has reached a certain level, items playable by the user (for example, a quest playable by users at a certain level or more, and a system or an item usable by users at a certain level or more) may be increased. Furthermore, for example, each time accumulated experience points exceed a certain threshold, the level of the user increases.

The following describes information for indicating candidate characters each user may use for organizing a party among game characters. The game program 251 provides each of the users with a plurality of game characters. A list of characters usable by the user is updated through advancement of a quest by the user, acquisition of a game character by the user as a result of making an input operation to enter a drawing, or other processing. A party organization may be formed by specifying some game characters out of the characters usable by the user.

The game progress status management table may manage the amount of virtual currency possessed by the user in association with each user. Virtual currency may be used for, for example, acquiring items consumed in the game, entering a drawing, and performing other operation. The game progress processor 192 receives an input operation to use virtual currency and purchase an item, enter a drawing, or the like and changes the amount of virtual currency possessed. The game program 251 may separately manage the amount of virtual currency purchased by the user and the amount of virtual currency provided to the user for free. The virtual currency may have a term of validity (for example, within six months after purchase for purchased virtual currency).

The information for indicating items owned by each user in the game indicates items wearable by characters as items associated with characters. Examples of the items wearable by characters include weapons, protectors, accessories, and other items wearable by the characters. The user is given these items wearable by characters through advancement of a quest, a drawing, or other processing. The information for indicating owned items indicates user items that, when used in the game play, exert a certain effect in the game play. These items are consumed through the user's input operation for using them. Examples of the items that, when used in the game play, exert a certain effect include items that increase experience points acquired when a quest is successfully finished or the acquired amount of items consumed for developing characters by a certain degree (for example, doubling the acquired amount) during a certain period of time (for example, 30 minutes) after the start of use of items.

FIG. 6 is a table for the server 20 to manage an event to be given to a user, as game information 252, according to at least one embodiment.

In FIG. 6, the game information 252 includes an event management table for managing events to be given to the user. The event management table include information for identifying each event, information for indicating a destination (target point) to which the user is designated to move in the event, information for indicating the content of events (including a combat event against a specific enemy character, an event to contact a specific game character, an event that requires a successful finish such as a dungeon, an event in which a specific item may be acquired, and other events), information for indicating the term of validity of the event, information for indicating the date, time, and place (location) when and where the user acquired the event (the server 20 set the event for the user), information for indicating the date and time when the user successfully finished the event, and information for indicating players participating in an event (an event in which a plurality of players may participate).

The information for identifying each event may be configured such that events related to the story progress are distinguishable from events not related to the story progress.

Figure 7:
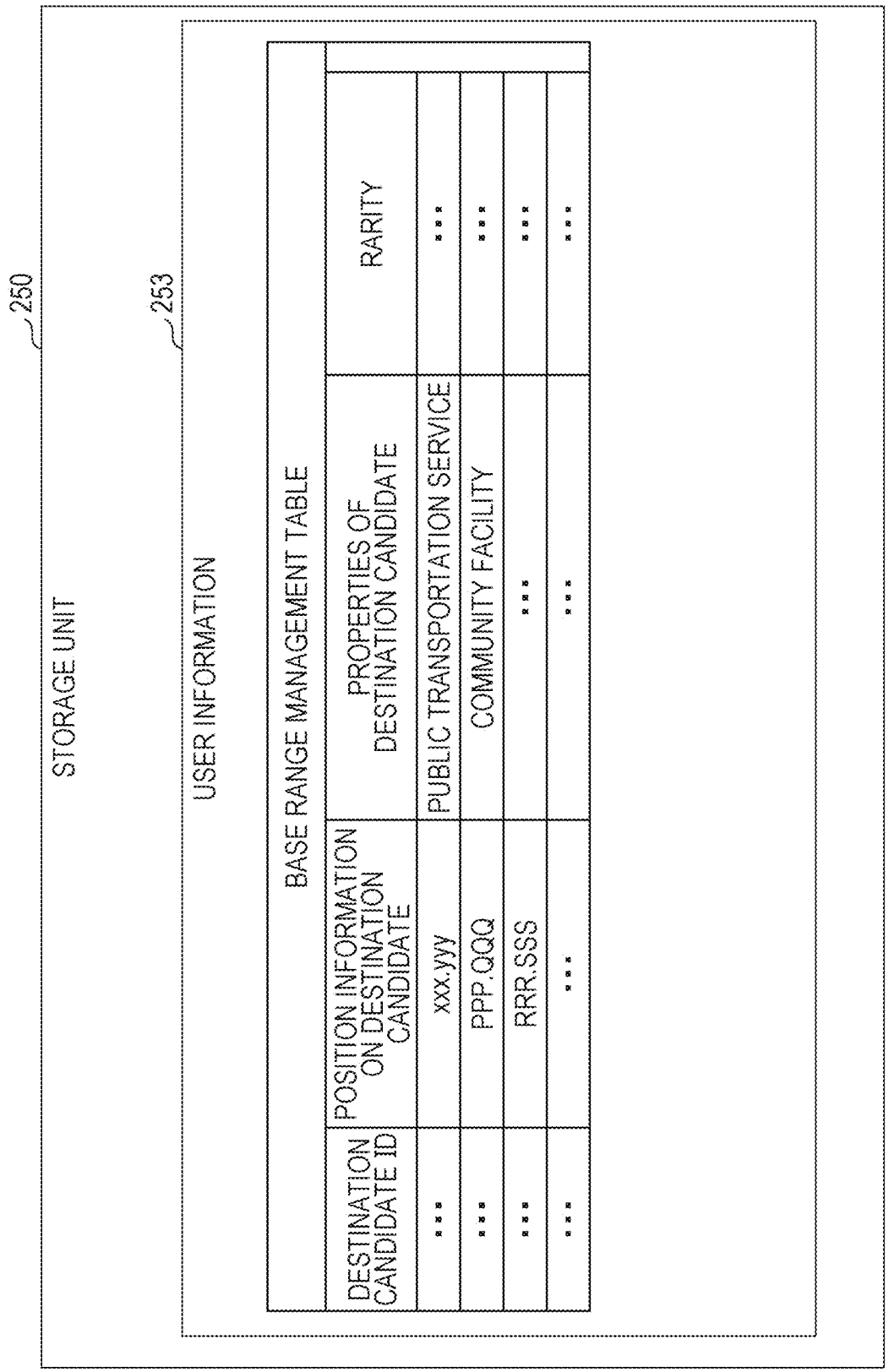
FIG. 7 A destination candidate management table for the server to manage a candidate to be set as a destination in an event, as game information, according to at least one embodiment.

FIG. 7 is a destination candidate management table for the server 20 to manage a candidate to be set as a destination in an event, as game information 252, according to at least one embodiment.

In FIG. 7, the destination candidate management table includes information for indicating each destination candidate, position information of a destination serving as a candidate in the event, properties of a candidate for the destination (examples of the properties of a candidate for the destination include the type of the facility, the type of place, and other information. Examples of the facilities serving as a candidate for the destination include community facilities (a city hall, a school, a park). Examples of the type of place of the destination include sight-seeing spots), and information for indicating the degree of probability (rarity) of being determined to be a destination in the event. For example, facilities with high probability of being set as a destination in the event have high probability of being visited by the user. For this reason, the server 20 may increase probability of being determined to be a destination in the event in response to a request from a facility to increase the probability of being visited by the user. In this way, a facility that wants to serve as a sponsor may have higher probability of being determined to be a destination in the event. Furthermore, the server 20 may decrease probability of being determined to be a destination in the event in response to a request from a facility or the like to decrease the probability of being visited by the user. In this way, for example, a facility that wants to keep the number of visitors at a moderate level may have lower probability of being determined to be a destination. Thus, adjusting destination candidates' probability of being determined to be a destination in the event may help prediction of movement of players.

The following describes operations of the mobile terminal 10 and the server 20 in at least one embodiment.

The game progress processor 192 in the mobile terminal 10 successively acquires the user positions through the terminal position acquisition unit 193 and transmits the acquired user positions to the server 20.

The server processor 292 in the server 20 receives the user positions from the mobile terminal 10 and the like, performs processing of random encounter with enemy characters or giving events in accordance with the received user positions, and transmits results of the processing in accordance with the user positions and map data in accordance with the user positions to the mobile terminal 10. This enables each user's terminal to successively update the map data in accordance with the user position and perform processing of causing events and the like in accordance with the user position.

(1) Processing, made by the user designating a position range in which facilities in the game are provided in the map data, to advance creation of a town (base) in the game.

The game progress processor 192 in the mobile terminal 10 causes a screen, for receiving designation made by the user on the position range in which facilities in the game are provided in the map data, to be displayed on the touch screen 130.

The game progress processor 192 receives an input operation on the touch screen 130 from the user, and receives inputs of designation made by the user on the attributes of facilities in the game to be provided in the map data (for example, designation to provide a facility "inn") and inputs of the position range in which facilities are provided (for example, a certain range including the location of a house is designated in the map data). In this process, the game progress processor 192 causes information on the position range the user has already designated to provide facilities in the game in the map data, together with the map data, to be displayed on the touch screen 130. Upon receiving designation on the position range in which facilities in the game are provided from the user, if the designated position range is not separated from another position range of facilities the user has already provided by a certain distance, the game progress processor 192 causes a display indicating facilities are not allowed to be provided and a display urging the user to designate a new position range in which facilities are provided that is separated from the position range of facilities the user has already provided by a certain distance, to be displayed on the touch screen 130.

The game progress processor transmits the designation on the attributes of facilities received from the user and information on the position range designated to provide facilities in the map data to the server 20.

The server processor 292 in the server 20 receives the information on the position range designated to provide facilities in the game in the map data and information on the attributes of facilities, from the mobile terminal 10, and updates the base range management table based on the received information. In this process, the server 20 registers information on the timing (date and time) the user designated the position range in the map data, in a database.

When the attributes of facilities providable by the user are expanded in accordance with the progress status of the story as the user advances the game, the game progress processor 192 may cause this fact to be displayed on the touch screen 130 and receive designation on the position range in which facilities are provided in the map data. In this manner, the user may gradually expand his or her travel range to update game parameters, which further enhances the attractiveness of the game.

(2) Processing, made by the user moving to the position range designated by the user, to configure game parameters based on the designated position range The game progress processor 192 in the mobile terminal 10 causes a display, on the touch screen 130, of the map data, the position range designated by the user to provide facilities in the game in the map data, and the user position acquired by the terminal position acquisition unit 193.

The game progress processor 192 compares the user position with the position range designated by the user and determines whether a positional relation between the user position and the position range designated by the user has a certain relation (whether the user is close to the position range designated by the user). For example, the game progress processor 192 determines whether the user is within the designated position range (alternatively, whether the position range designated by the user is within a certain range from the user position may be determined). The game progress processor 192, if the user position is not within the position range designated by the user, disables configuration of game parameters from facilities corresponding to the position range (for example, as for a facility "tool shop", enabling purchase of an item, and as for an facility "inn", recovering physical power values and the like of characters operated by the user), and if the user position is within the position range designated by the user, enables configuration of game parameters from facilities corresponding to the position range.

When the user makes an input operation for configuring game parameters by moving to the position range designated by the user, the mobile terminal 10 transmits the content of configuration of game parameters in accordance with the content of the user's input operation to the server 20. The server 20 updates the game information 252, the user information 253, and various other types of database based on the information received from the mobile terminal 10 (for example, when the user has purchased an item, in the information for managing the game progress status of the user, information for indicating the carrying of the item in association with the user is updated in a database).

(3) Processing by the server 20 to determine a location serving as a destination in an event, in accordance with the position at which the user acquired the event The server 20 causes random encounter with enemy characters in accordance with the user position, and gives the user an event as the user successfully finishes a combat event against the enemy characters. (Note that the locations in the map data may have different encountering rates of enemy characters. For example, encounter with enemy characters may be unlikely in some areas.)

The server processor 292 in the server 20 refers to the information on the user position received from the mobile terminal 10 and retained, every time the processing of giving the user an event is performed, and extracts candidates for a destination within a certain distance from the user position in the information from the destination candidate table.

The server processor 292 determines the rarity of an event to be given to a user, and in accordance with the rarity, deciding the destination of the event to be given to a user in a drawing. The server processor 292 generates an event including the destination decided in a drawing, updates the game progress status management table indicating the game progress status of the user, and transmits information on the generated event to the mobile terminal 10.

While the operations of the mobile terminal 10 and the server 20 included in the game distribution system in some embodiments have been described, each piece of processing performed by the mobile terminal 10 may be performed by the server 20, and each piece of processing performed by the server 20 may be performed by the mobile terminal 10.

For example, the mobile terminal 10 receives the user's input operation on the touch screen 130 and transmits the content of the received operation to the server 20. The server 20 receives the user's input operation from the mobile terminal 10, performs each piece of processing for advancing the game, generating display screens to be displayed on the mobile terminal 10 based on arrangement of virtual cameras, and causes the generated display screens to be successively displayed on the mobile terminal 10. In this manner, the server 20 may perform most of the processing for advancing the game. Alternatively, the mobile terminal 10 may perform most of the processing for advancing the game.

One of ordinary skill in the art would understand that the embodiments disclosed above are merely examples in all aspects and in no way intended to limit this disclosure. The scope of this disclosure is defined by the appended claims and not by the above description, and this disclosure is intended to encompass all modifications made within the scope and spirit equivalent to those of the appended claims.

<Note 1>

[Item 1]

A method by which a computer advances a game based on position information of a user. The method includes performing, by a processor, a step of receiving an input operation with which the user designates a specific position range that enables the user existing therein to have a game parameter configured, in map data used in the game. The method further includes a step of acquiring the position information of the user. The method further includes a step of advancing a game such that, when the acquired position of the user is included in the specific position range designated by the user, the game parameter of the user is configurable.

[Item 2]

The method according to item 1 of note 1, in which the step of receiving the input operation by the computer comprises receiving designation of a plurality of the specific position ranges from the user such that the specific position ranges are designated at least at a certain interval.

[Item 3]

The method according to item 2 of note 1, in which the step of receiving the input operation by the computer comprises receiving the designation such that the specific position ranges are designated at least with a certain predetermined distance therebetween as the certain interval.

[Item 4]

The method according to item 2 of note 1, in which the step of receiving the input operation by the computer comprises receiving the designation such that, when the specific position ranges include a departure and arrival location of a public transportation service, the specific position ranges are designated at least with a distance therebetween as the certain interval, the distance being based on a travel speed set for the public transportation service and a predetermined travel time.

[Item 5]

The method according to any one of items 1 to 4 of note 1, in which the step of receiving the input operation by the computer comprises receiving designation of the specific position range and designation of any of a plurality of attributes that are able to be associated with the designated specific position range from the user. The step of advancing the game comprises advancing the game such that, when the acquired position of the user is included in the specific position range designated by the user, the game parameter of the user is configurable in accordance with the attribute designated by the user in association with the specific position range.

[Item 6]

The method according to item 5 of note 1, further includes performing, by the computer, a step of managing a degree of advancement by which the user has advanced a predetermined series of progress events out of events provided to the user in the game. The step of receiving the input operation by the computer comprises receiving the designation from the user, with the attributes designatable in accordance with the specific position range expanded in accordance with the degree of advancement made by the user.

[Item 7]

The method according to item 6 of note 1, further includes performing, by the computer, a step of, when a position at which a combat event is caused to combat against a certain game character and the acquired position information of the user satisfy a certain positional relation in the map data used in the game, associating the combat event with the user. The method further includes a step of associating the event with the user through playing of the combat event. The event associated with the user through the playing of the combat event includes the progress event.

[Item 8]

The method according to any one of items 1 to 7 of note 1, in which the step of receiving the input operation by the computer comprises, when the user satisfies a certain condition regarding the specific position range designated by the user in the map data, receiving re-designation of the specific position range.

[Item 9]

The method according to any one of items 1 to 8 of note 1, further includes performing, by the computer, a step of enabling the user to execute a specific command in the game in accordance with the user's game play. The step of advancing the game comprises receiving execution of the specific command from the user and advancing the game such that the game parameter of the user is configurable in a same manner even if the acquired position of the user is not included in the specific position range designated by the user, as in a case in which the user position is included in the specific position range.

[Item 10]

A program for causing a computer to implement the method according to any one of items 1 to 9 of note 1.

[Item 11]

A system comprising a computer configured to advance a game based on position information of a user includes a memory configured to store an instruction. The system further includes a processor electrically connected to the memory. The processor is configured to load and execute the instruction stored in the memory to: receive an input operation with which the user designates a specific position range that enables the user existing therein to have a game parameter configured, in map data used in the game; acquire the position information of the user; and advance a game such that, when the acquired position of the user is included in the specific position range designated by the user, the game parameter of the user is configurable.

<Note 2>

[Item 1]

A method by which a computer advances a game based on position information of a user, the method performing, by a processor, a step of setting a quest for the user, the quest being playable by the user moving to a specific area, in map data used in the game. The method further includes a step of acquiring the position information of the user. The method further includes a step of enabling the user to play the quest when the user exists in the specific area designated in the quest, based on the acquired position information of the user. The quest includes a quest playable by a plurality of users. The step of enabling the user to play the quest comprises, based on position information acquired for each of the users, enabling the users existing in the specific area designated in the quest to cooperate and play the quest.

[Item 2]

The method according to item 1 of note 2, in which the step of setting the quest for the user by the processor in the computer comprises setting an encounter event caused based on the acquired position information of the user for the user. The method further includes performing, by the computer, a step of receiving game play of the encounter event from the user and advancing the game. The step of setting the quest for the user by the processor comprises setting the quest playable by the plurality of users for the user as the encounter event is successfully finished.

[Item 3]

A program for causing a computer to implement the method according to item 1 or 2 of note 2.

<Note 3>

[Item 1]

A method by which a computer advances a game based on position information of a user, the method includes performing, by a processor, a step of acquiring the position information of the user. The method further includes a step of managing a game parameter of an operation character the user operates. The method further includes a step of setting an encounter event for the user, the encounter event including a combat against another game character, based on the acquired position information of the user. The method further includes a step of executing combat processing in the encounter event. The step of setting the encounter event for the user comprises setting no encounter event based on the user position information for the user when a parameter related to a physical power value of the operation character is used up through execution of the combat processing.

[Item 2]

The method according to item 1 of note 3, in which the step of managing a game parameter of an operation character comprises, when a parameter related to a physical power value of the operation character is used up, recovering the parameter related to the physical power value to a certain extent under a certain condition.

[Item 3]

The method according to item 1 or 2 of note 3, in which the step of executing the combat processing comprises executing an auto-battle of the combat processing regardless of whether the user has made an input operation. The step of managing a game parameter of an operation character comprises managing a result of the combat processing as a history. The method further includes performing, by the processor, receiving, from the user, an input operation for designating a result of the combat processing indicated in the history and performing a combat against the other game character related to the combat processing.

[Item 4]

A program for causing a computer to implement the method according to any one of items 1 to 3 of note 3.

<Note 4>

[Item 1]

A method by which a computer advances a game based on position information of a user, the method includes performing, by a processor, a step of setting a quest for the user, the quest being playable by the user moving to a specific area, in map data used in the game. The method further includes a step of acquiring the position information of the user. The method further includes a step of enabling the user to play the quest when the user exists in the specific area designated in the quest, based on the acquired position information of the user. The quest includes a quest in which a game character operatable by the user appears and a quest related to a story progress in the game. The step of enabling the user to play the quest comprises setting the quest in which the game character appears for the user as the user successfully finishes the quest related to the story progress to a certain extent.

[Item 2]

A program for causing a computer to implement the method according to item 1 of note 4.

<Note 5>

[Item 1]

A method by which a computer advances a game based on position information of a user, the method includes performing, by a processor, a step of acquiring the position information of the user. The method further includes a step of setting a quest for the user, the quest being playable by the user moving to a specific area, in map data used in the game. The method further includes a step of managing a game parameter of an operation character the user operates. The method further includes a step of setting an encounter event for the user, the encounter event including a combat against another game character, based on the acquired position information of the user. The method further includes a step of executing combat processing in the encounter event. The step of managing the game parameter comprises, as the user successfully finishes the quest related to the story progress to a certain extent, enabling the user to acquire the other game character, against which the user has combatted in the encounter event through execution of the combat processing, as a character operatable by the user.

[Item 2]

A program for causing a computer to implement the method according to item 1 of note 5.

<Note 6>

[Item 1]

A method by which a computer advances a game based on position information of a user, the method includes performing, by a processor, a step of setting a quest for the user, the quest being playable by the user moving to a specific area, in map data used in the game. The method further includes a step of managing candidate information of the specific area in which the quest is playable in the map data. The method further includes a step of acquiring the position information of the user. The method further includes a step of enabling the user to play the quest when the user exists in the specific area designated in the quest, based on the acquired position information of the user. The step of setting the quest for the user comprises extracting candidate information of the specific area within a certain distance based on the position information of the user in the step of setting the quest for the user and setting the quest for the user based on the extracted candidate information.

[Item 2]

The method according to item 1 of note 6, in which the step of setting the quest for the user comprises, based on at least either difficulty of the quest or rarity of the quest, determining the specific area to be included in the quest from the candidate information of the specific area within a certain distance based on the position information of the user.

[Item 3]

A program for causing a computer to implement the method according to item 1 or 2 of note 6.

<Note 7>

[Item 1]

A method by which a computer advances a game based on position information of a user, the method includes performing, by a processor, a step of setting a quest for the user, the quest being playable by the user moving to a specific area, in map data used in the game. The method further includes a step of acquiring the position information of the user. The method further includes a step of enabling the user to play the quest when the user exists in the specific area designated in the quest, based on the acquired position information of the user. The quest includes a quest including a plurality of subquests. The step of setting the quest for the user comprises presenting a part of the subquests included in the quest and, in accordance with a status in which the user has successfully finished the part of the subquests, successively presenting unpresented subquests to the user.

[Item 2]

A program for causing a computer to implement the method according to item 1 of note 7.

10 mobile terminal, 20 server, 22 communication IF, 23 I/O IF, 25 memory, 26 storage, 29 processor, 80 network, 81 wireless base station, 82 wireless router, 110 antenna, 120 wireless communication IF, 130 touch screen, 131 touch panel, 132 display, 150 storage, 151 game program, 152 game information, 153 user information, 154 map data, 160 audio processor, 170 microphone, 180 speaker, 190 controller, 191 an input operation reception unit, 192 game progress processor, 193 move operation detection unit, 194 camera arrangement controller, 195 object controller, 196 display controller, 220 communication unit, 250 storage, 251 game program, 252 game information, 253 user information, 256 map data, 290 controller, 291 transceiver, 292 server processor, 293 data management unit

The invention claimed is:

1. A method comprising:
receiving, using a graphical user interface (GUI), an input from a user;
designating, using a processor, a position range in a real world based on the input, wherein designating the position range comprising designating a virtual facility associated with the position range based on the received input from the user;
receiving from a server a virtual event from a plurality of virtual events, wherein the virtual event is based on progress of the user in a game;
determining a position of the user in the real world using a global positioning system (GPS);
playing on the GUI the received event in response to the position of the user being within the position range; and
disabling the GUI from playing the received event in response to the position of the user being outside of the position range.

2. The method according to claim 1, wherein the designating the position range comprises designating of a plurality of position ranges, and adjacent position ranges of the plurality of position ranges are separated by at least at a certain distance interval.

3. The method according to claim 2, wherein the certain distance interval is at least a predetermined threshold distance interval, and the predetermined threshold distance interval is based on the progress of the user in the game.

4. The method according to claim 2, wherein, in response to a first position range of the plurality of position ranges including a departure and arrival location of a real world public transportation service, the certain distance interval is based on a travel speed set for the public transportation service and a predetermined travel time between the departure and arrival location.

5. The method according to claim 1, further comprising:
receiving designation of an attribute of a plurality of attributes that are associated with the position range, and
advancing the game such that, in response to the position of the user being within in the position range, a game parameter of the user is adjusted based on the designated attribute.

6. The method according to claim 5, further comprising: updating the plurality of attributes based on the progress of the user in the game.

7. The method according to claim 1, wherein the event comprises a combat event.

8. The method according to claim 1, wherein designating the position range comprises, in response to the user satisfying a predetermined condition regarding the position range, re-designating of the position range.

9. The method according to claim 1, further comprising:
advancing the game, in response to receiving a predetermined command from the user, such that a game parameter of the user is configurable in a same manner regardless of whether the position of the user is within the position range.

10. The method according to claim 1, wherein the event comprises a quest, and the method further comprises:
enabling the user to play the quest in response to the position information being in a predetermined location in the position range, wherein the quest is playable by a plurality of users.

11. The method according to claim 10, further comprising:
receiving an encounter event, in response to the user playing the quest; and
advancing the quest in response to the encounter event being successfully finished by at least one user of the plurality of users.

12. The method according to claim 2, wherein the event comprises a quest, and the method further comprises:
enabling the user to play the quest in response to the position information being in a predetermined location in the position range, wherein the quest is playable by a plurality of users.

13. The method according to claim 12, further comprising:
receiving an encounter event, in response to the user playing the quest; and
advancing the quest in response to the encounter event being successfully finished by at least one user of the plurality of users.

14. The method according to claim 10, further comprising:
advancing the quest by causing a game character to appear, in response to the user completing a predetermined event, wherein the game character is controllable by the user.

15. A method comprising:
receiving, using a graphical user interface (GUI), an input from a user;
designating, using a processor, a position range in a real world based on the input;
receiving from a server a virtual event from a plurality of virtual events, wherein the virtual event is based on progress of the user in a game;
determining a position of the user in the real world using a global positioning system (GPS);
playing on the GUI the received event in response to the position of the user being within the position range;
disabling the GUI from playing the received event in response to the position of the user being outside of the position range;
setting a combat event against a game character, based on the position of the user; and
executing combat processing, wherein the user acquires control of the game character in response to the user completing a predetermined event.

16. A method comprising:
receiving from a mobile device including a graphical user interface (GUI) a position range in a real world based on an input from a user, wherein the input from the user indicates a location for a virtual facility associated with the position range in the real world;
determining, using a processor, a virtual event from a plurality of virtual events, wherein the virtual event is based on progress of the user in a game;
receiving a position of the user in the real world using a global positioning system (GPS); and
transmitting the virtual event, wherein the transmitting the virtual event comprises:
transmitting a type of the virtual event for playing on the GUI;
transmitting a timing of the virtual event for playing on the GUI; and
transmitting a location of the virtual event in the position range detectable by the GPS.

17. The method according to claim 16, wherein determining the virtual event comprises determining the location of the virtual event based on a difficulty of the virtual event.

18. The method according to claim 16, wherein determining the virtual event comprises determining the location of the virtual event based on a rarity of the virtual event.

19. The method according to claim 16, further comprising receiving a first attribute from the user, wherein the determining the virtual event comprises determining the virtual event based on the first attribute.

20. The method according to claim 16, further comprising:
- setting a combat event against a game character, based on the position of the user; and
- executing combat processing, wherein the user acquires control of the game character in response to the user completing a predetermined event.

* * * * *